(12) United States Patent
Broussard et al.

(10) Patent No.: US 6,561,746 B1
(45) Date of Patent: May 13, 2003

(54) APPARATUS FOR LOADING AND UNLOADING A VEHICLE BED

(76) Inventors: Cresward Broussard, 18832 Gaulman Rd., Abbeville, LA (US) 70510; Robert E. Borison, 3709 Lake Aspen West Dr., Gretna, LA (US) 70056

( * ) Notice: Subject to any disclaimer, the term of this patent is extended or adjusted under 35 U.S.C. 154(b) by 0 days.

(21) Appl. No.: 09/999,628

(22) Filed: Oct. 30, 2001

(51) Int. Cl.[7] .................. B60P 1/34; B60P 1/64
(52) U.S. Cl. ...................... 414/500; 414/538
(58) Field of Search ................ 414/500, 494, 414/538

(56) References Cited

U.S. PATENT DOCUMENTS

| | | | | |
|---|---|---|---|---|
| 2,820,560 A | * | 1/1958 | Davis | 214/517 |
| 5,306,113 A | * | 4/1994 | Mann | 414/537 |
| 5,556,249 A | * | 9/1996 | Heine | 414/500 |
| 6,089,816 A | * | 7/2000 | Christ | 414/538 |

* cited by examiner

Primary Examiner—Steven A. Bratlie
(74) Attorney, Agent, or Firm—Greg R. Mier

(57) ABSTRACT

A loading/unloading system designed to easily load and unload wheeled vehicles from the bed of a larger vehicle. The loading/unloading system generally includes a vertically flexible support surface on wheels, U-shaped loading tracks for receiving the wheels of the support surface, a winch with accompanying cable assembly for pulling the support surface onto the loading tracks and into the bed of a vehicle, and a set of offloading springs with accompanying cable assemblies for pushing the support surface out of the bed of the vehicle when desired.

7 Claims, 7 Drawing Sheets

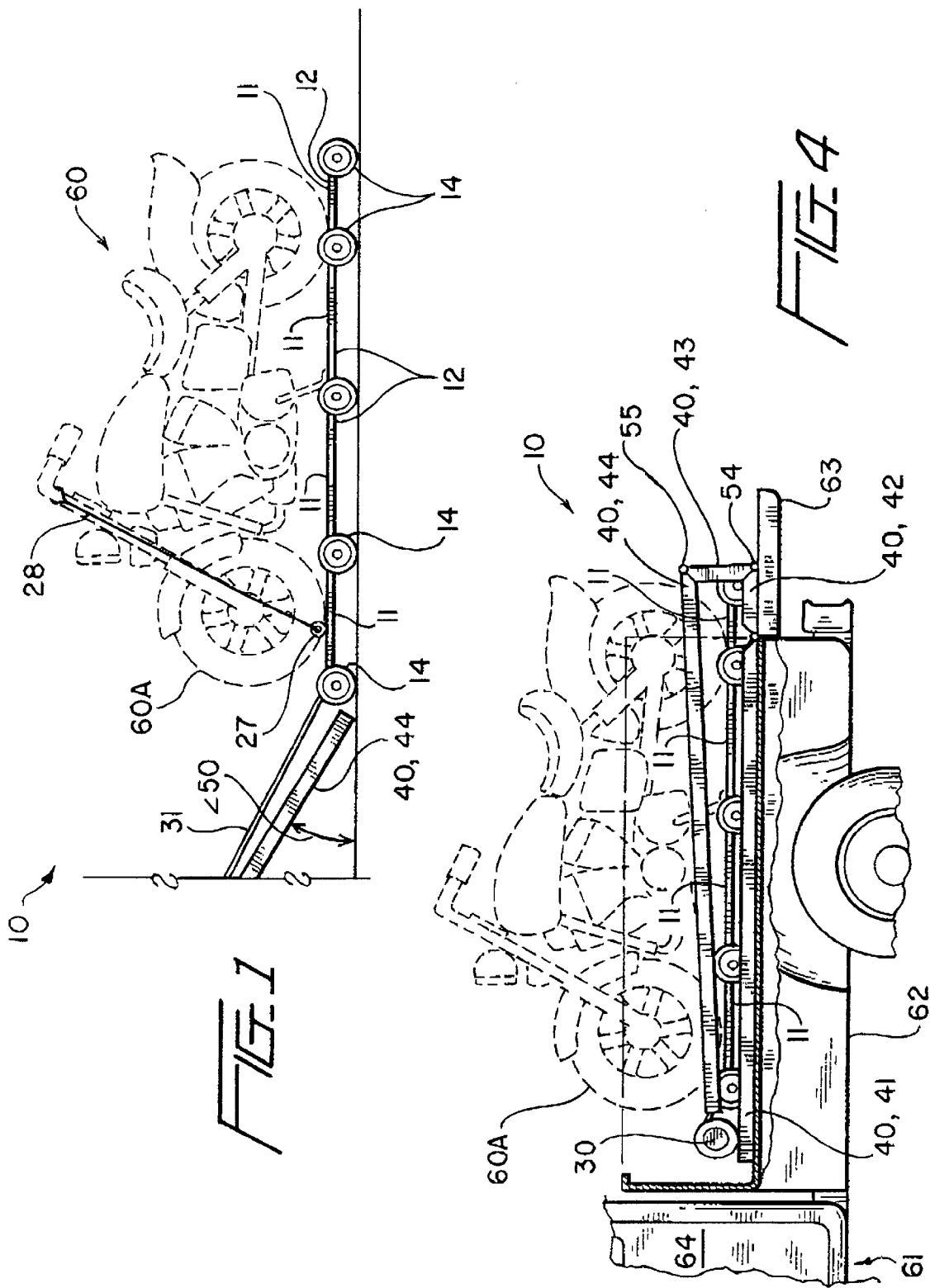

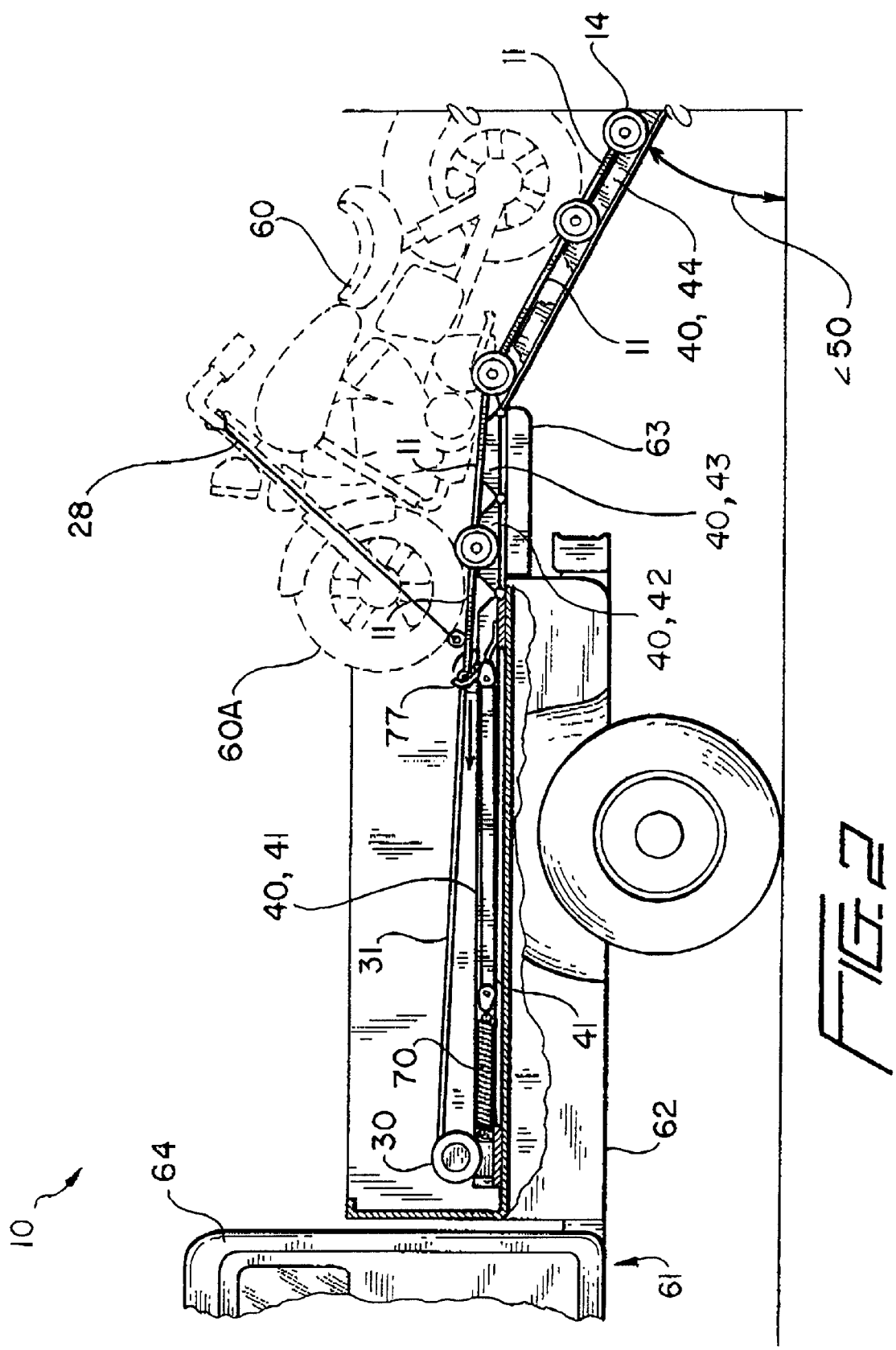

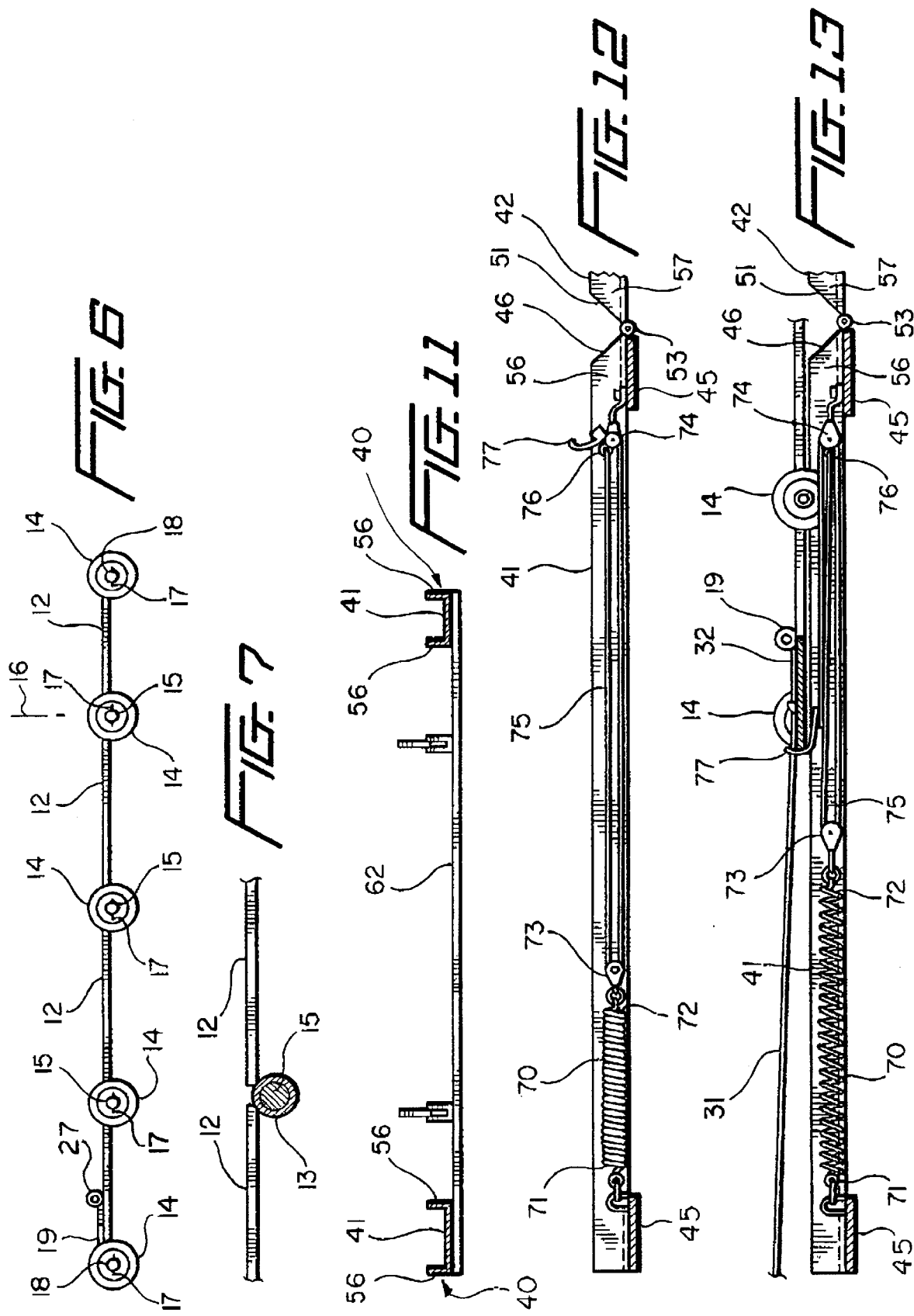

APPARATUS FOR LOADING AND UNLOADING A VEHICLE BED

BACKGROUND

1. Field of the Invention

The present invention relates to devices for loading cargo into the bed of a vehicle. More particularly, the present invention relates to an improved loading and unloading system which enables the user to easily load and unload heavy and cumbersome cargo, such as motorcycles and all-terrain vehicles, into and out of the bed of a vehicle.

2. Description of Related Art

Many wheeled vehicles (e.g., motorcycles, all-terrain vehicles, and the like) are often very heavy and cumbersome, making it difficult to lift them into or out of the bed of another vehicle. Trailers are sometimes used to carry such wheeled vehicles from one location to another, but trailers are heavy to tow, costly to rent or purchase, and difficult to handle on the road and while parking. Therefore, it is often more desirable to carry motorcycles, all-terrain vehicles, and the like in the bed of a larger vehicle, such as a pick-up truck or flat-bed truck.

Unfortunately, most people cannot load and unload such heavy and cumbersome vehicles onto and off the bed of a larger vehicle without some type of mechanical assistance. As a result, many cargo loading and unloading systems have been developed over the years. Representative examples of these systems are disclosed in U.S. Pat. No. 5,807,058 to Masse, U.S. Pat. No. 5,755,549 to Ogrodnick, U.S. Pat. No. 5,556,249 to Heine, U.S. Pat. No. 5,269,642 to Zoromski, U.S. Pat. No. 5,234,307 to Scott, U.S. Pat. No. 2,820,560 to Davis, and U.S. Pat. No. 2,354,337 to Smith.

None of the inventions disclosed in the aforementioned patents provide the unique features of the present invention, as discussed in more detail below.

OBJECTS OF THE INVENTION

A primary object of the present invention is to provide a loading/unloading system that allows a user to easily load and unload wheeled vehicles from the bed of another vehicle.

Another object of the present invention is to provide a loading/unloading system that employs an articulated loading/unloading surface that eliminates the danger and potential personal injuries and property damage caused when a rigid support surface is slid or rolled out of the bed of a vehicle and bangs down onto the ground when enough of the rigid support surface extends beyond the bed of the vehicle, or when a rigid support surface is slid or rolled at an angle from the ground into the bed of a vehicle and bangs down into the bed when enough of the rigid support surface extends into the bed of the vehicle.

Another object of the present invention is to provide a loading/unloading system that virtually eliminates the risk of back strain from lifting heavy and cumbersome objects into and out of the bed of a vehicle.

Another object of the present invention is to provide a loading/unloading system that stabilizes the wheeled cargo during loading, unloading, and in transit.

Another object of the present invention is to provide a loading/unloading system that provides a mechanism that forces the support surface out of the bed of the vehicle during the unloading process.

Other and further objects, features and advantages of the present invention will be readily apparent to those skilled in the art when the following description of the preferred embodiments is read in conjunction with the accompanying drawings.

SUMMARY OF THE INVENTION

The present invention solves the problems unresolved by the prior art by using a loading/unloading system that is designed to easily load and unload heavy and cumbersome cargo from the bed of a vehicle. The loading/unloading system generally includes a vertically flexible support surface on wheels, a pair of U-shaped loading tracks for receiving the wheels of the support surface, a winch with accompanying cable assembly for pulling the support surface into the bed of a vehicle, and a set of offloading springs with accompanying cable assemblies for forcing the support surface out of the bed of the vehicle when desired.

The support surface includes multiple planar segments, each of which are preferably rectangular in shape. The number and size of the planar surface segments depend on the size of the vehicle in which the loading/unloading system will be installed. For example, in a pick-up truck having a standard six-foot long bed, four 18-inch planar segments will be utilized. In a pick-up truck having a standard eight-foot long bed, either five 18-inch or four 24-inch planar segments will be used.

The planar segments are pivotly joined together in series, preferably using hinges that extend the entire width of the planar segments. The planar segments are independently supported by wheels that are preferably located at opposite sides of the planar surface segments, so that the wheels are receivable in the U-shaped loading tracks.

Wheel stops can be installed on any of the planar segments, as desired, to help prevent the loaded vehicle from shifting during loading, unloading, or in transit.

The U-shaped loading tracks facilitate the movement of the wheels of the movable support surface between the bed of the vehicle and the ground. The first section of the loading track is attached to the bed of the carrying vehicle, and preferably extends nearly the entire length of the bed. The second, third, and fourth sections of the loading track are pivotly attached in series to the first section and extend from the tail end of bed of the carrying vehicle to the ground. When not in use, the second, third, and fourth sections of the loading track can be folded into the bed of the carrying vehicle.

The offloading springs are designed to facilitate the unloading of a loaded vehicle. The front ends of the offloading springs are preferably fastened to the carrying vehicle in a position not to interfere with the movement of the movable support surface. The rear ends of the offloading springs are preferably connected to pulley assemblies, which include latching mechanisms that latch onto the movable support surface as it is pulled into the vehicle. The movement of the movable support surface causes the latching mechanisms to pull and expand the offloading springs. The offloading springs remain expanded until the unloading process, during which unloading process the offloading springs compress and force the movable support surface out of the bed of the vehicle.

BRIEF DESCRIPTION OF THE DRAWINGS

The invention will be better understood by reference to the accompanying drawings wherein:

FIG. 1 is a partial elevational view of the present invention, showing the movable support surface flat on the ground with a motorcycle loaded thereon;

FIG. 2 is a partial elevational view of the present invention, showing the movable support surface in transition between the ground and the bed of a vehicle;

FIG. 4 is a partial elevational view of the present invention, showing the loading tracks folded into the bed of a vehicle;

FIG. 6 is an elevational view taken along lines 6—6 of FIG. 5;

FIG. 7 is a sectional view taken along lines 7—7 of FIG. 5;

FIG. 11 is a sectional view taken along lines 11—11 of FIG. 10;

FIG. 12 is a sectional view taken along lines 12—12 of FIG. 10.

FIG. 13 is a sectional view of the present invention, showing the offloading springs is an extended position;

DESCRIPTION OF THE INVENTION

Figure 15:
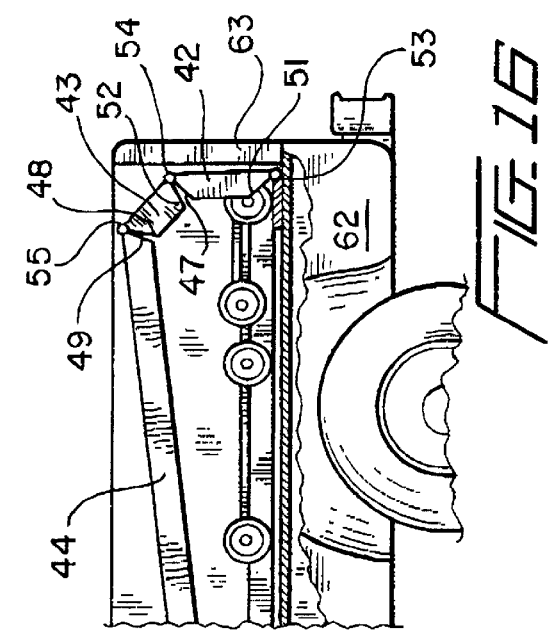
FIG. 15 is a partial elevational view of the loading tracks and offloading springs of the present invention.

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof) falling within the scope of the appended claims.

The loading system 10 of the present invention is shown in FIGS. 1 through 4. Loading system 10 generally includes a support surface 11, loading tracks 40, a winch 30 with accompanying cable assembly, and a set of offloading springs 70 with accompanying cable assembly. As demonstrated in FIGS. 1 through 4, and as discussed in more detail below, loading system 10 is designed to easily load and unload heavy and cumbersome cargo from the bed of a vehicle 61. The various parts of loading system 10 can be constructed of any metal, such as aluminum, stainless steel, or carbon steel, or any other suitable material.

Figure 5:
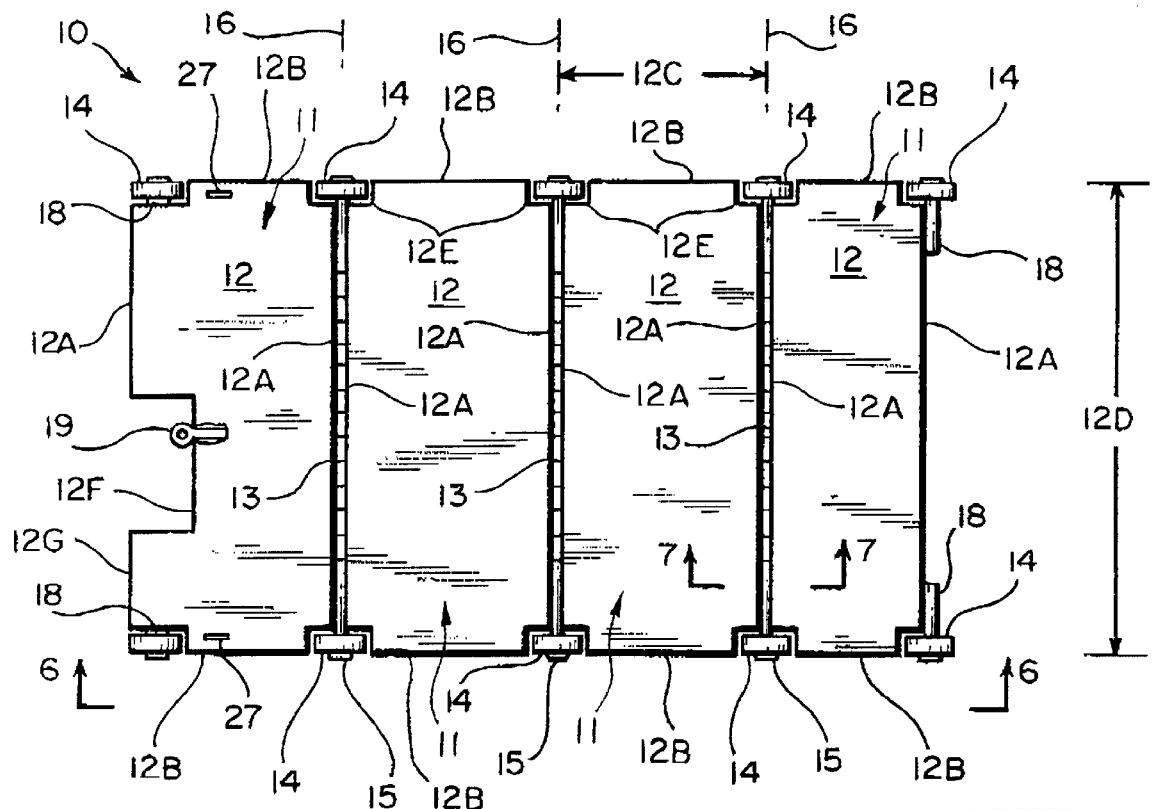
FIG. 5 is a top view of the movable support surface assembly of the present invention.

Referring now to FIGS. 5 and 6, support surface 11 includes multiple planar segments 12, each of which are preferably rectangular in shape, and each of which have two longer edges 12A and two shorter edges 12B. The number, size, and shape of multiple planar segments 12 will depend on the size of vehicle 61 in which loading system 10 is installed. For example, in a pick-up truck having a standard six-foot long bed, each planar segment 12 will have a length 12C of approximately 18 inches and a width 12D of approximately forty-eight inches, thereby requiring four planar segments 12 to cover most of the bed of the pick-up truck. In a pick-up truck having a standard eight-foot long bed, either a fifth planar segment 12 with a length 12C of approximately eighteen inches can be added to the series, or four planar segments 12 with a length 12C of approximately 24 inches each would suffice. Now referring to FIGS. 5 and 7, planar segments 12 are pivotly joined together in series, preferably using hinges 13. Hinges 13 are preferably positioned between the longer edges 12A of two adjacent planar segments 12. Hinges 13 can be welded to the two opposing longer edges 12A, or attached by any other means known to those skilled in the art. For added stability, hinges 13 preferably extend approximately the entire width 12D of planar segments 12, as shown in FIG. 5.

Center axles 15 preferably extend concentrically through hinges 13 along axis 16, as shown in FIGS. 5 and 7. For planar segments 12 that are located at each end of support surface 11, corner axles 18 are secured near the outer most edges 12A of planar segments 12, as shown in FIG. 5.

Wheels 14 are rotatably secured with locking pins 17, or by any other means known to those skilled in the art, to both ends of each center axle 15 that concentrically extends through hinges 13. Wheels 14 are also similarly secured to the outer most ends of corner axles 18 which are secured to planar segments 12 located at each end of support surface 11, as shown in FIG. 6. Wheels 14 roll along loading tracks 40 during the loading and unloading of a wheeled vehicle 60, as discussed in more detail below.

Figure 3:
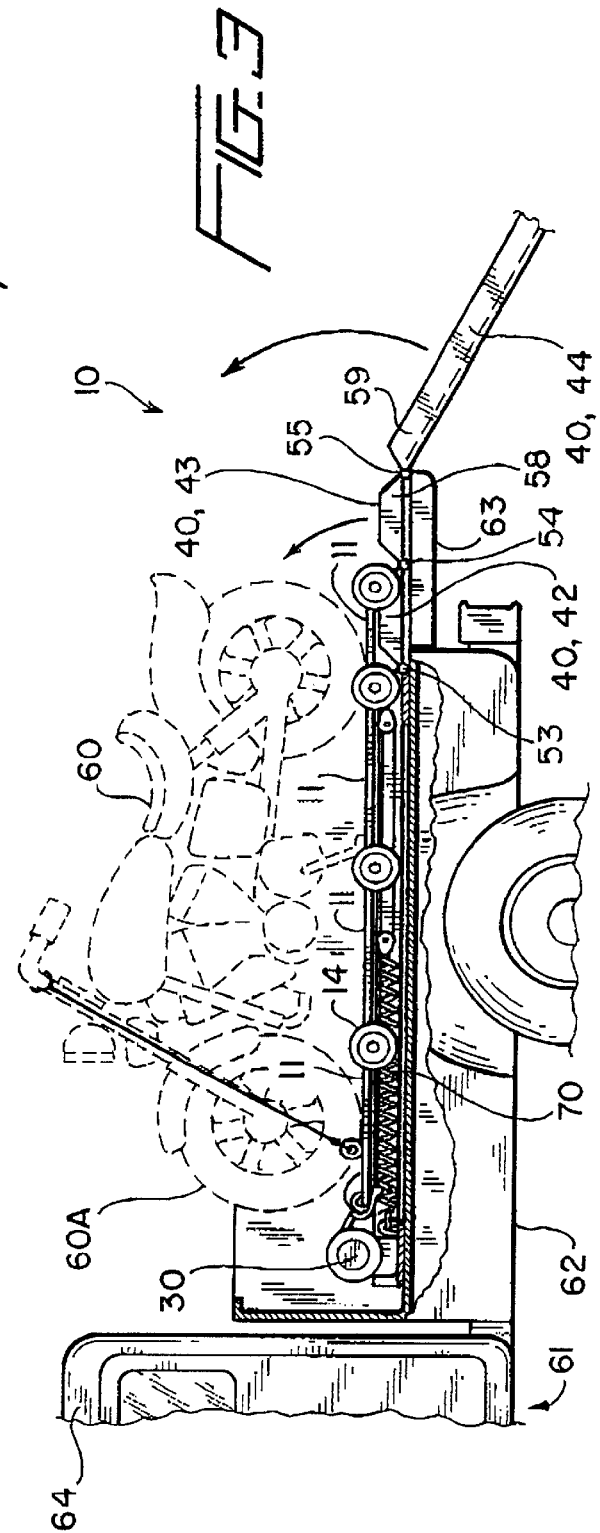
FIG. 3 is a partial elevational view of the present invention, showing the movable support surface laying flat in the bed of a vehicle, with a motorcycle loaded thereon.

In the preferred embodiment of the present invention, the corner sections 12E of multiple planar segments 12 are cutaway to provide clearance for wheels 14 to rotate freely as support surface 11 is moved to its loaded or unloaded position. Also, a lateral section 12F can be cut away from leading edge 12G of planar segment 12 which is nearest to cab 64 of vehicle 61 to provide clearance for winch 30, which is preferably attached near the front of bed 62 of vehicle 61, as shown in FIGS. 2–4.

Eyelet 19 is preferably welded or attached by any other suitable means near leading edge 12G of planar segment 12 nearest to cab 64. Eyelet 19 provides a means for connecting winch cable 31 to loading surface 11, as shown in FIGS. 5 and 6.

Figure 8:
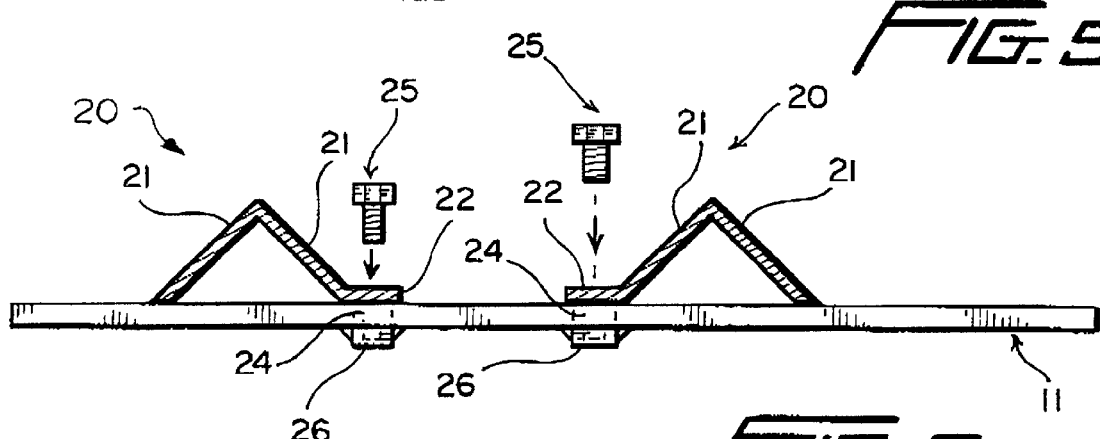
FIG. 8 is a sectional view of the wheel stops of the present invention.
Figure 9:
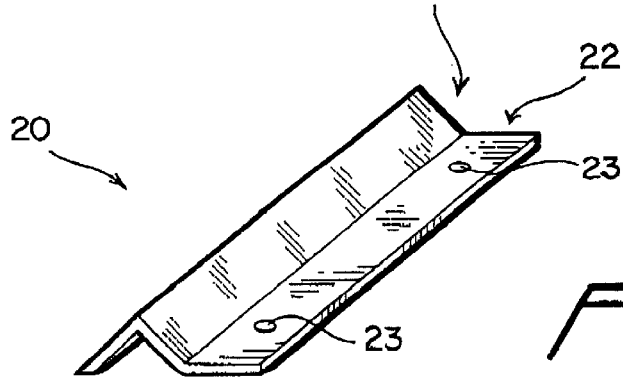
FIG. 9 is an isometric view of a portion of the wheel stops of the present invention.

Now referring to FIGS. 8 and 9, wheel stops 20 can be installed on any planar segment 12, as desired, to help prevent wheeled vehicle 60 from shifting during loading, unloading, or in transit. Wheel stops 20 can be constructed of two pieces of angle iron 21, which can be positioned approximately a few inches away from each other, as desired, and approximately parallel to each other. Wheel stops 20 are also preferably positioned approximately parallel to longer edges 12A on any planar segment 12, depending on where the wheels of wheeled vehicle 60 will be located when it is loaded onto support surface 11. Wheel stops 20 can be equipped with a flat bar 22, having a set of bolt holes 23 drilled therethrough. Wheel stops 20 can be secured to any planar segment 12 by drilling matching bolts holes 24 through planar segment 12 at the desired location, and then inserting a bolt 25 through bolt holes 23 and 24 and using a nut 26 for securing wheel stops 20 to planar segment 12.

Padeyes 27 can also be welded or attached by any other suitable means to any planar segment 12, as shown in FIGS. 1, 5, and 6. Tie downs 28 can be removably connected between padeyes 27 and wheeled vehicle 60 to further help prevent wheeled vehicle 60 from shifting during loading, unloading, or in transit.

Now referring to FIGS. 10 through 15, loading tracks 40 facilitate the movement of wheels 14 in and out of bed 62 of vehicle 61. Loading tracks 40 can be constructed of a series of longitudinally connected rails, each having U-shaped cross sections, as shown in FIG. 11. Each loading track 40 should be substantially identical to any other, and the following description pertains to any and all loading tracks 40 that may form a part of the present invention.

Figure 10:
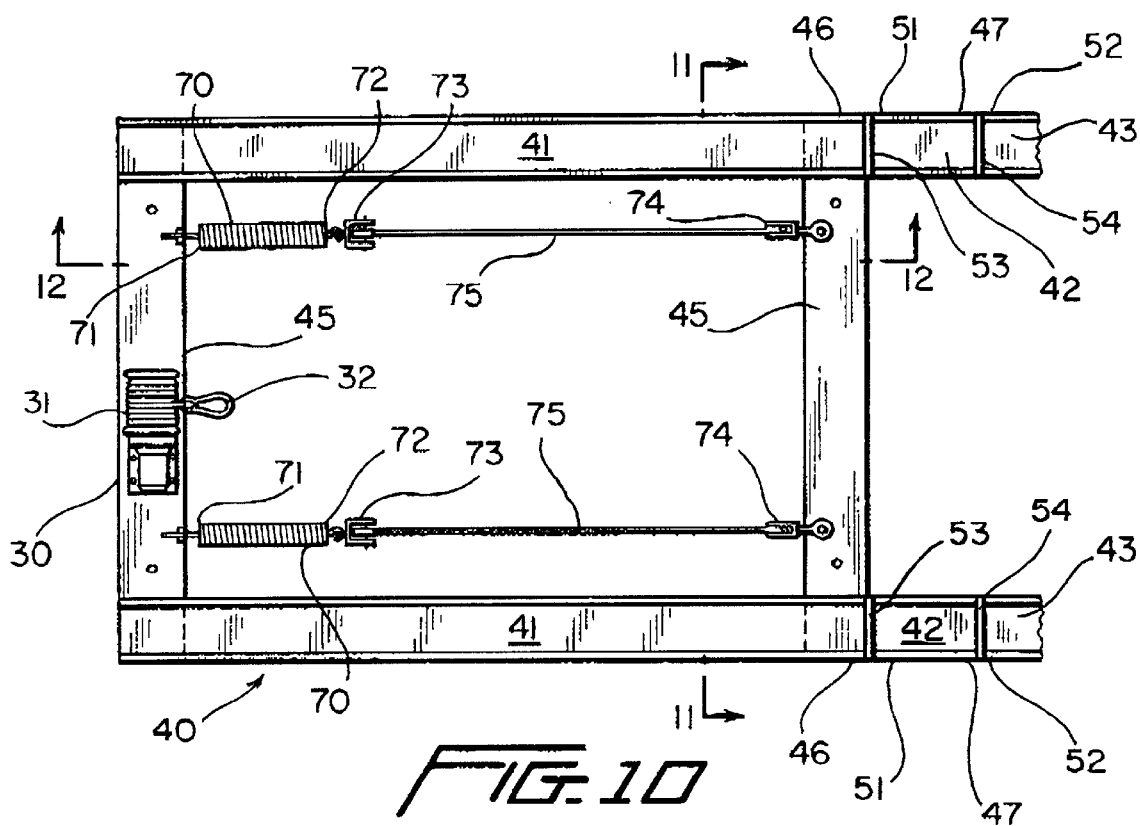
FIG. 10 is a partial top view of the loading tracks of the present invention.
Figure 14:
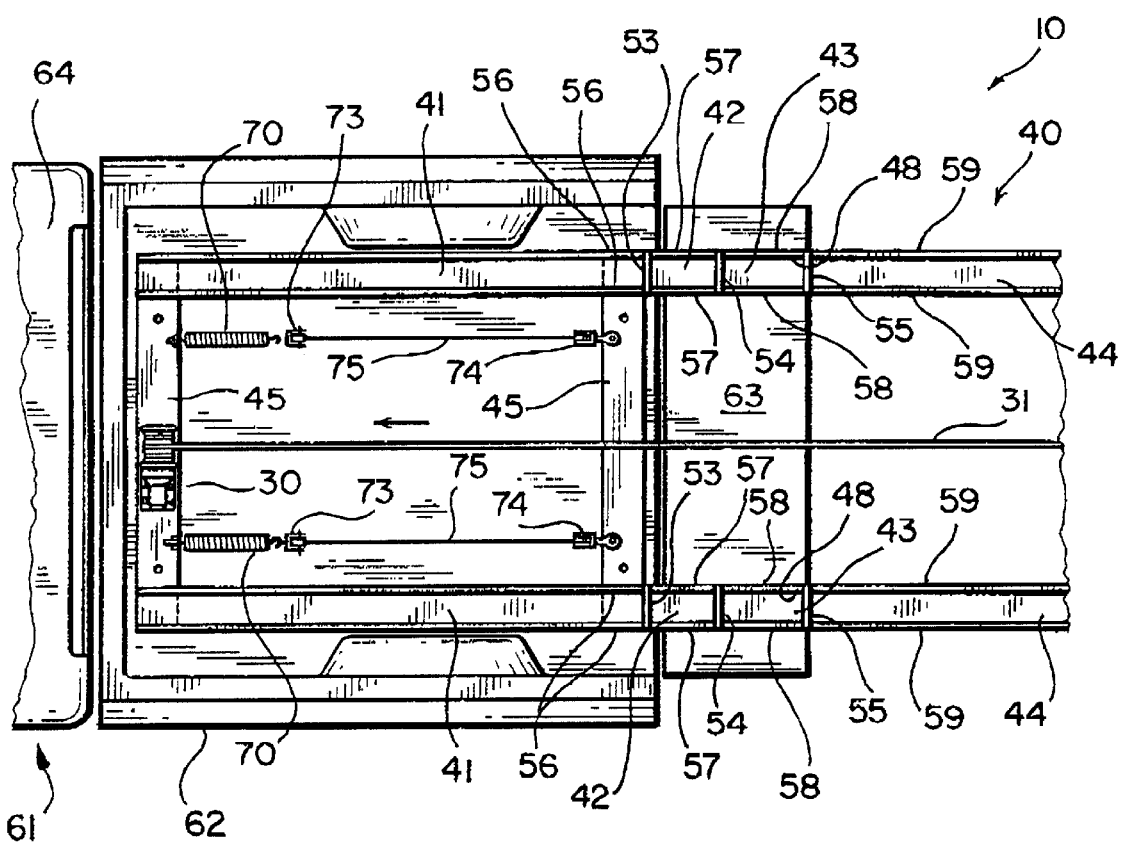
FIG. 14 is a partial top view of the loading tracks and offloading springs of the present invention.

First section 41 of loading track 40 is welded or bolted or attached by any other suitable means to bed 62 of vehicle 61, approximately parallel to any other first section 41, as shown in FIG. 10. First section 41 preferably extends approximately the entire length of bed 62 of vehicle 61, as shown in FIG. 14. Lateral support beams 45 can be connected between first sections 41 to keep first sections 41 aligned with each other, and also to possibly provide a means for anchoring first sections 41 to bed 62 of vehicle 61 by welding or attaching by any other suitable means lateral support beams 45 to bed 62, as shown in FIGS. 10 and 14.

Second section 42 of loading track 40 is pivotly attached to tail end 46 of the corresponding first section 41, preferably using a hinge 53, as shown in FIG. 10. Second section 42 is preferably parallel to other second sections 42 and extends half the length of tailgate 63 (if applicable). Third section 43 of loading track 40 is pivotly attached to tail end 47 of the corresponding second section 42, preferably using a hinge 54. Third section 43 is preferably parallel to other third sections 43 and also extends half the length of tailgate 63 (if applicable). Fourth section 44 of loading track 40 is likewise pivotly attached to tail end 48 of the corresponding third section 43, preferably using a hinge 55, as shown in FIG. 14. Fourth section 44 is preferably parallel to other fourth sections 44 and extends down to the surface upon which vehicle 61 is sitting, so that fourth section 44 is at an angle 50 of approximately 30 to 55 degrees from said surface, depending on the height of bed 62 of vehicle 61, as shown in FIGS. 1 and 2.

Figure 17:
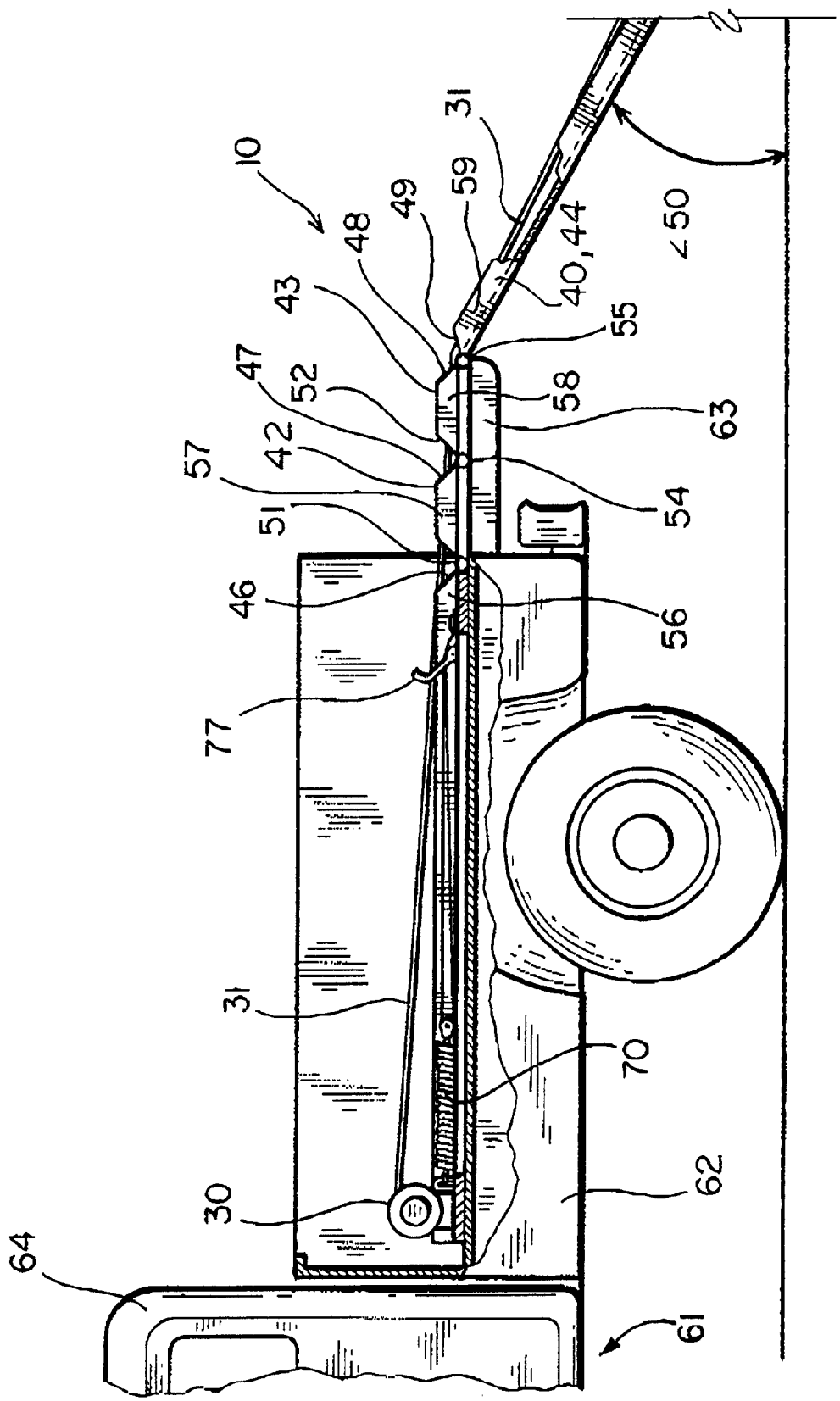
FIG. 17 is a partial elevational view of the present invention, showing the loading tracks in its extended position.

Vertical edges 56 at tail end 46 of first section 41, along with vertical edges 57 and 58 at both ends 47, 48, 51, and 52 of second and third sections 42 and 43, in addition to vertical edges 59 at head end 49 of fourth section 44, are all beveled, as shown in FIG. 17, to allow the second, third, and fourth sections 42, 43, and 44 of loading track 40 to be folded into the bed 62 of carrying vehicle 61 when not in use, as shown in FIGS. 14 and 17.

Now referring to FIGS. 10, 12, and 13, offloading springs 70 are designed to facilitate the unloading of wheeled vehicle 60 from bed 62 of vehicle 61. Each offloading spring 70 should be identical to the other, and the following description pertains to any and all offloading springs 70 that may form a part of the present invention.

Figure 16:
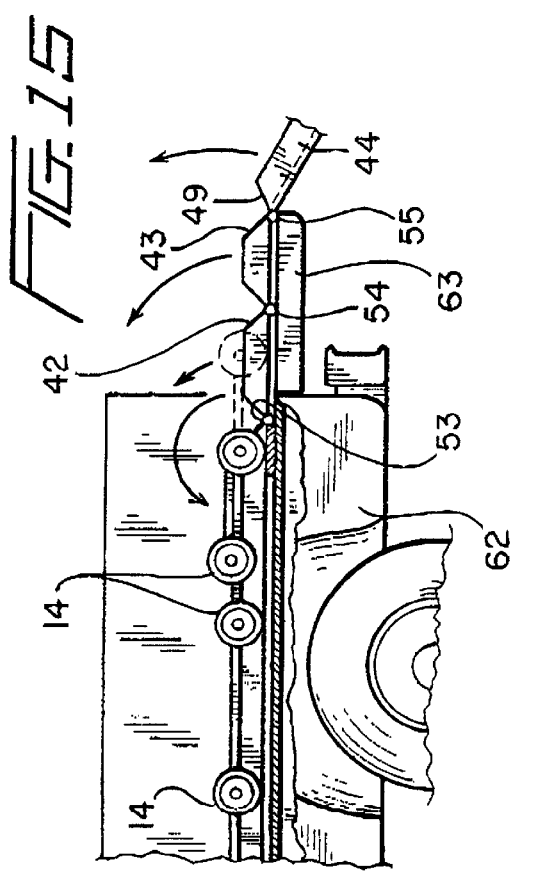
FIG. 16 is a partial elevational view of the loading tracks of the present invention, showing the loading tracks folded into the bed of a vehicle.

Front end 71 of offloading spring 70 is preferably welded, bolted, or fastened using any other suitable means to lateral support beam 45 near the front of bed 62, in a position not to interfere with the movement of support surface 11, as shown in FIGS. 12 and 13. Rear end 72 of offloading spring 70 is fixably connected to first pulley device 73. Second pulley device 74 is preferably welded, bolted or fastened using any other suitable means to lateral support beam 45 near the rear of bed 62, also in a position not to interfere with the movement of support surface 11, as shown in FIGS. 12 and 13. First end 76 of pulley cable or cord 75 is fixably connected to second pulley device 74, as shown in FIG. 12. Pulley cable or cord 75 extends from its fixably connected position on second pulley device 74, around the rotating wheel of first pulley device 73, and around the rotating wheel of second pulley device 74, where pulley cable or cord 75 terminates at a pulley cable hook or latch 77, which is fixably connected to pulley cable or cord 75, as shown in FIG. 16. As support surface 11 is pulled into bed 62 of vehicle 61, leading edge 12G of planar segment 12 comes into contact with pulley cable latch 77 and pushes said latch 77 forward, thereby causing pulley cable 75, along with first and second pulley devices 73 and 74, to stretch offloading spring 70 into an expanded position, where offloading spring 70 will remain as such until wheeled vehicle 60 is unloaded, as explained in further detail below.

Referring now to FIG. 10, a winch 30 is preferably welded, bolted or attached by any other suitable means to vehicle 61 near the front end of bed 62. Winch 30 is preferably equipped with a cable 31, having a hook 32 fixably attached to the free end of cable 31. During loading operations, hook 32 is removably attached to eyelet 19, which is shown in FIGS. 5 and 6, so that winch 30 can be used to pull support surface 11 up loading tracks 40 into bed 62 of vehicle 61.

Operation of loading system 10 of the present invention is illustrated in FIGS. 1 through 4, and 16 and 17. Beginning with FIGS. 1 and 17, loading system 10 is shown in a position before loading. Tailgate 63 is down (if applicable), and loading tracks 40 are unfolded and extended to the ground. Winch cable 31 is extended, allowing support surface 11 to be positioned flat on the ground.

In FIG. 1, wheeled vehicle 60, in this case a motorcycle, is shown resting on support surface 11. Front wheel 60A of wheeled vehicle 60 is positioned between two wheel stops 20 (shown in FIG. 8), to help prevent wheeled vehicle 60 from shifting during loading, unloading, or in transit. Wheeled vehicle 60 is further supported with tie-downs 28, which extend to padeyes 27. As shown in FIG. 17, offloading springs 70 are fully compressed, with latch 77 in a position ready to latch onto leading edge 12G of planar segment 12.

The loading begins when winch 30 is activated. As winch 30 begins to wind cable 31, the force exerted through cable hook 32 and eyelet 19 causes support surface 11 to approach ramp sections 44 of loading tracks 40. As winch 30 continues to wind cable 31, wheels 14 engage the U-shaped ramp sections 44 of loading tracks 40 and begin to track upward toward tailgate 63 (if applicable) of vehicle 61. As the first planar segment 12 begins its climb, hinge 13 between the first and second planar segments 12 allows support surface 11 to articulate at this point. Each of the remaining hinges 13 perform the same articulating function as support surface 11 continues its climb.

As shown in FIG. 2, hinges 13 allow support surface 11 to articulate a second time as support surface 11 is pulled past the transition point between ramp sections 44 and tailgate sections 42 and 43 of loading tracks 40. The articulating effect provided by planar segments 12 and hinges 13 are particularly beneficial at this stage of the loading process, in that a non-articulating support surface would continue to ramp upward at the same angle 50 of ramp section 44 until enough of the support surface had passed the transition point at the edge of tailgate 63 to allow the front end of the support surface to slam down into bed 62 of vehicle 61. The same benefit is realized during the unloading process, where the back end of a non-articulating support surface would slam down onto ramp sections 44 when enough of the support surface had passed the transition point at the edge of tail gate 63.

As winch 30 continues to wind cable 31, leading edge 12G of planar segment 12 reaches latch 77. Latch 77 latches onto leading edge 12G, thereby causing pulley cables 75, along with first and second pulley devices 73 and 74, to begin extending offloading springs 70.

Winch 30 continues to wind cable 31 until support surface 11 reaches its final resting place in bed 62 of vehicle 61, as shown in FIG. 3. At that point, winch 30 is deactivated. Offloading springs 70 are fully extended and stand ready to provide a counter force when the loading process is reversed.

To complete the loading process, ramp sections 44 and tailgate sections 42 and 43 are folded into bed 62 of vehicle 61, as shown in FIG. 4. Tailgate 63 (if applicable) can then be closed, as shown in FIG. 16.

To unload wheeled vehicle 60, the process is essentially reversed. Once tailgate 63 (if applicable) is opened, and ramp sections 44 and tailgate sections 42 and 43 are unfolded, winch cable 31 is allowed to unwind while offloading springs 70 provide the extra force needed to easily move support surface 11 backwards far enough until gravity begins to pull support surface 11 down ramp sections 44.

Thus, the present invention provides a new and useful system for loading and unloading heavy and cumbersome cargo from the bed of a vehicle.

What is claimed is:

1. A system for loading and unloading cargo to and from a bed of a vehicle, said system comprising:
    (a) a movable support surface comprising at least two planar segments pivotly connected in series at adjacent edges, said pivoted connection being constructed so as to allow the series of at least two planar segments to flex vertically, each at least two planar segments being independently supported by a plurality of wheel assemblies that extend below said at least two planar segments;
    (b) a track for receiving thereover said plurality of wheel assemblies of said at least two planar segments, said track extending from the bed of said vehicle to a surface underneath said vehicle;
    (c) a winch mounted to said vehicle for controlling the movement of said movable support surface from said surface underneath said vehicle onto said track and into said bed of said vehicle, the winch having a cable removably connected to said movable support surface;
    (d) an offloading spring having two ends, the first end being attached to said vehicle;
    (e) a latching mechanism for latching onto said movable support surface as said winch moves said movable support surface into the bed of said vehicle, said latching mechanism being connected to the second end of said offloading spring by a cable and pulley system, whereby when said winch moves said movable support surface into the bed of said vehicle, the latching mechanism latches onto said movable support surface, causing said offloading spring to extend and store energy which is used when said movable support surface is moved from the bed of said vehicle to the surface underneath said vehicle.

2. The system of claim 1 wherein said at least two planar segments are rectangular in shape, where said pivoted connection is a hinge.

3. The system of claim 2 further comprising a center axle concentrically extending through said hinge, said center axle having two ends, where at least one of said plurality of wheel assemblies is rotatably attached to each end of said center axle.

4. The system of claim 3 further comprising a corner axle attached to each corner of said movable support surface, said corner axles being substantially parallel to said center axle, where at least one of said plurality of wheel assemblies is rotatably attached to each corner axle.

5. The system of claim 1 further comprising at least one wheel stop fixably attached to one of at least two planar segments.

6. The system of claim 1 where said track comprises at least two substantially parallel U-shaped rails, each rail having at least two pivotly connected sections that collectively extend longitudinally along the bed of said vehicle and angularly down to the surface underneath said vehicle, said pivoted connection being constructed so as to allow the sections of said rails to be folded into the bed of said vehicle when not in use.

7. The system of claim 6 where said at least two pivotly connected sections of each at least two substantially parallel U-shaped rails are vertically beveled at both pivoted connections to facilitate the folding of said sections into the bed of said vehicle when not in use.

* * * * *